May 27, 1947.  T. W. CHEW  2,421,012
HOMING SYSTEM
Filed Dec. 10, 1945  3 Sheets-Sheet 1
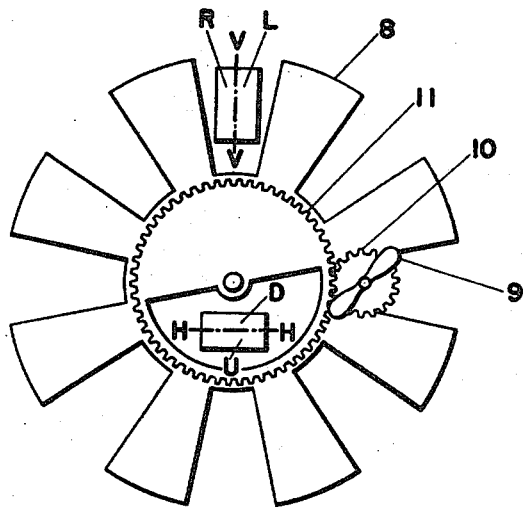
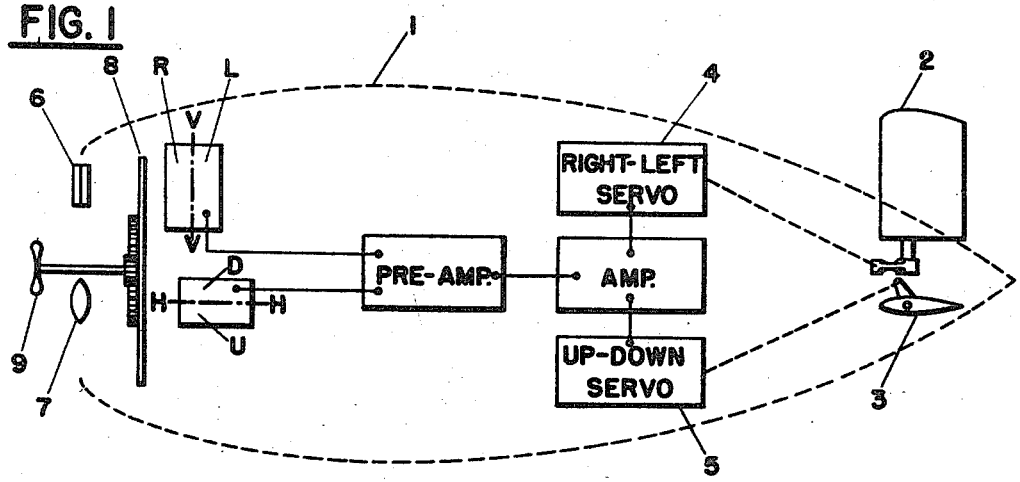
THORNTON W. CHEW  Inventor
By M. A. Heyes
Attorney

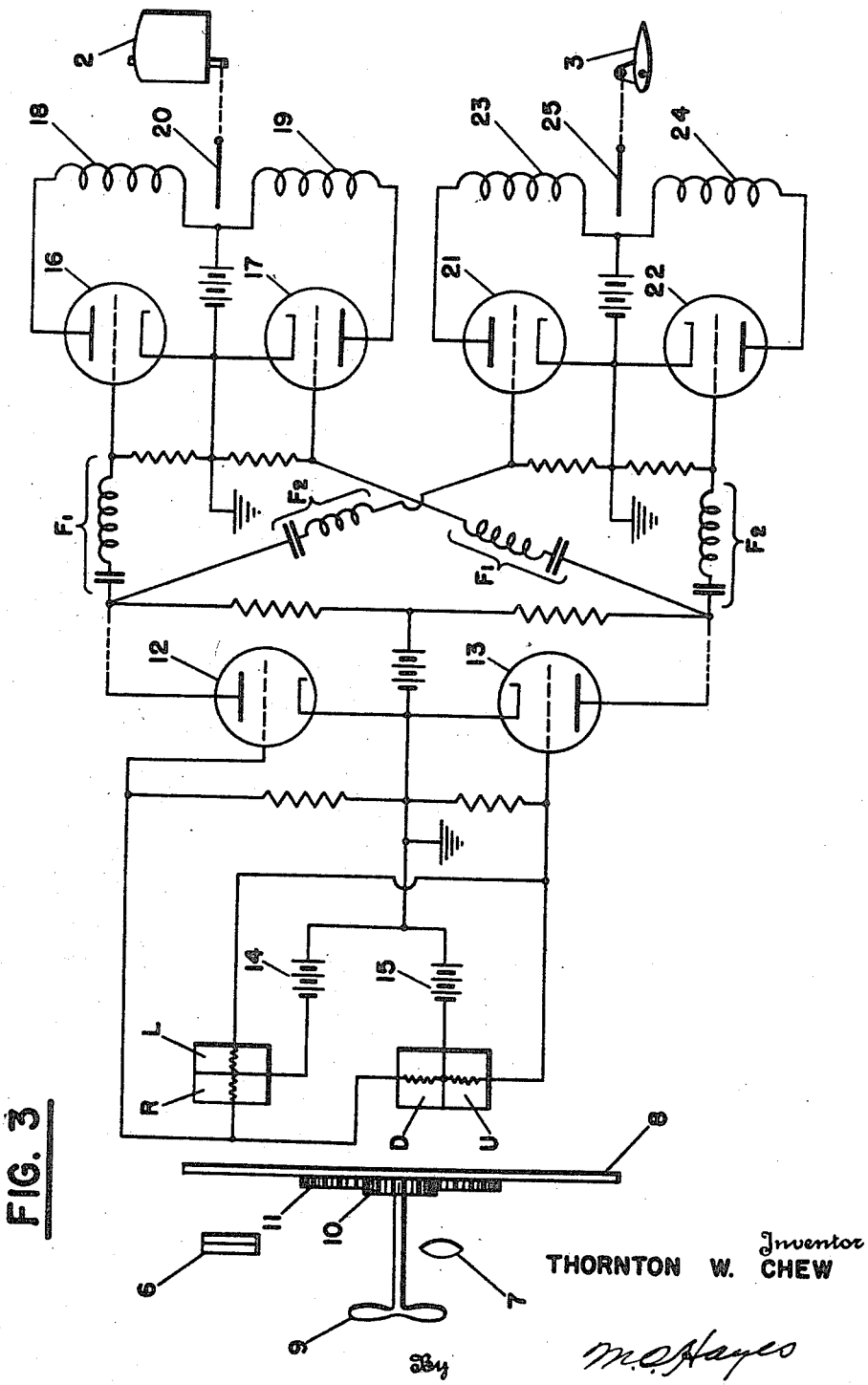

May 27, 1947.   T. W. CHEW   2,421,012
HOMING SYSTEM
Filed Dec. 10, 1945   3 Sheets-Sheet 3
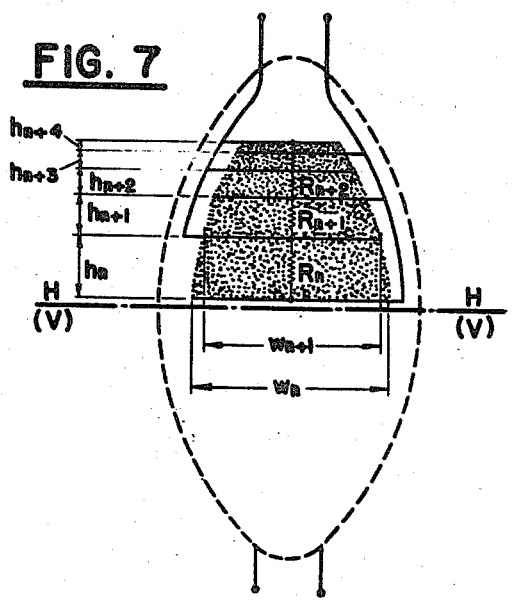
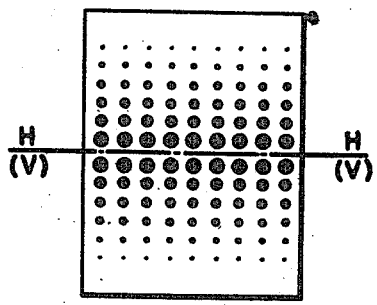
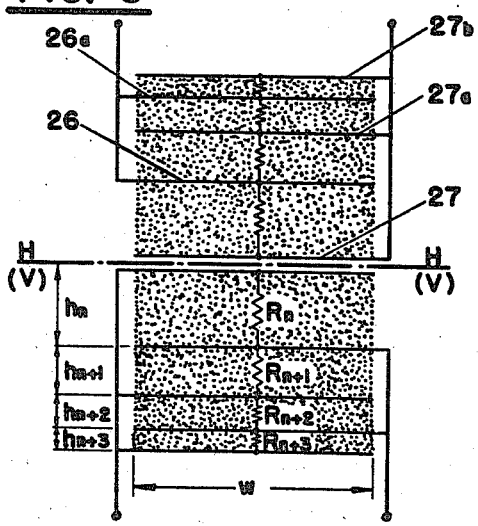
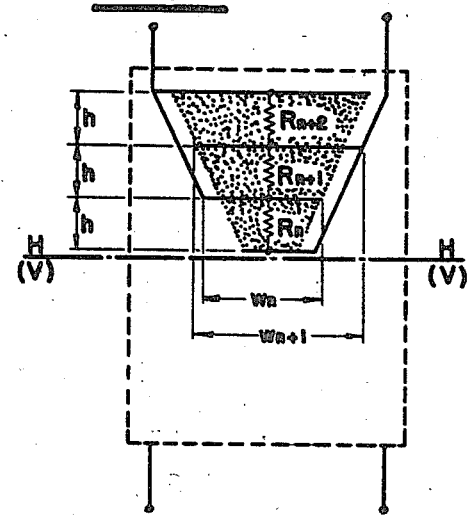
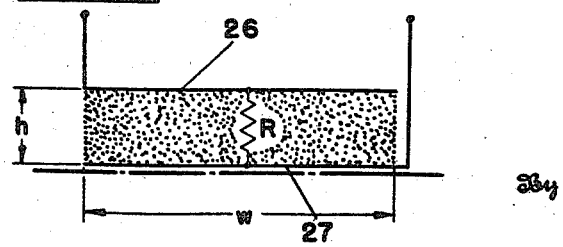
Inventor
THORNTON W. CHEW
By M. O. Hayes
Attorney Patented May 27, 1947

2,421,012

UNITED STATES PATENT OFFICE 2,421,012

HOMING SYSTEM

Thornton W. Chew, United States Navy

Application December 10, 1945, Serial No. 634,135

16 Claims. (Cl. 250—41.5)

(Granted under the act of March 3, 1883, as amended April 30, 1928; 370 O. G. 757)

My invention relates to homing systems for automatic guidance of movable objects, such as bombs or aircraft, toward movable or stationary objectives such as targets or landing areas.

In general, vertical and horizontal surfaces for steering of the object are actuated in response to deviation of images of the target from vertical and horizontal reference lines each between a pair of adjoining photo-cells responsive to radiation from the target.

In accordance with one aspect of my invention, the effective sensitivity of at least one pair of the photo-cells is increased by use of a cylindrical lens which distorts the target image by enlargement in direction parallel to the reference line between the cells.

Further in accordance with my invention, the field of view of the optical system associated with the photo-cells having the horizontal reference line is substantially greater than the field of view of the optical system associated with the photo-cells having the vertical reference line, thus to take into consideration that the quadhedral angle of approach to the target is of greater magnitude in horizontal direction than it is in vertical direction.

In accordance with another aspect of my invention, the amplifier system, necessarily interposed between the photo-cells and the actuating mechanisms for the steering apparata is simplified by use of a common amplifier channel for both pairs of photocells and by providing an output filter system therefor which segregates signals from the different pairs of cells in accordance with their corresponding carrier frequencies as produced by periodic interruption, at different frequencies, of the radiation to the different pairs of cells.

In accordance with another aspect of my invention, to afford correction for deviations from proper course in minimum time without excessive hunting, it is provided that the signal output of each pair of photo-cells shall increase at greater and greater rate for successive equal increases in deviation from the homing course.

My invention further resides in the methods, systems and components having features hereinafter described and claimed.

For an understanding of my invention, reference is made to the accompanying drawings in which:

Fig. 1 schematically illustrates a guided missile and control system therefor.

Fig. 2 is a front view on enlarged scale of a rotating shutter device included in Fig. 1.

Fig. 3 comprises a side view of the shutter shown in Fig. 2 and a schematic diagram of the electrical control system shown in block form in Fig. 1.

Fig. 4 is an explanatory figure referred to in discussion of photo-cell characteristics.

Figs. 5, 6 and 7 illustrate various forms of photo-cells particularly suited for use in the control system shown in Figs. 1 and 3.

Fig. 8 illustrates an optical filter for use with photo-cells included in the control system shown in Figs. 1 and 3.

Referring to Fig. 1, the missile 1 which may be a bomb or a self-propelled craft is provided with a control surface such as rudder 2 movable to steer it to the right or left and control surfaces such as vane 3 to steer it up or down. These control surfaces are automatically actuated as hereinafter described to correct for deviations from proper course.

The control system for rudder 2 includes a pair of photo-cells R, L whose net output is zero when a radiation image of the target is equally distributed between the sensitive areas of the two cells, that is equally distributed on opposite sides of the vertical reference line V—V. If the target image is not so centered, the output of one or the other of cells R, L predominates and the rudder 2 is actuated by its servo-control mechanism 4 to turn the missile 1 in proper direction to attain a centered target image.

Similarly, when the target image is not equally distributed above and below the horizontal reference line H—H of a second pair of photo-cells U, D the servo-control mechanism 5 tilts the vane 3 in proper sense to re-center the target image.

Because the probable angle of approach of the target is greater horizontally than vertically, it is desirable that the angle of view of the radiation-sensitive system comprising the photo-cells R, L, U and D be wider in a horizontal plane than in a vertical plane. This objective is attained by use of a wide-angle cylindrical lens 6 for focusing the target image on photo-cells R, L and a narrower-angle cylindrical lens 7 for focusing the target image on photo-cells U, D. The axes of the lenses are mutually perpendicular in a plane transverse to their optical axes which are parallel, the high ratio of distance to the target to the distance between the optical axes of the lenses making parallax of negligible effect on accuracy of the control. The lenses may be of any material suitably transparent to the radiation, visible or invisible to the eye, utilized.

Use of the cylindrical type of lens is of advantage because it has the effect of increasing the sensitivity of the photo-cell couples. In general, the conductivity of photo-sensitive materials does not increase linearly with increase of incident radiation. For example, in the case of selenium, the conductivity varies as the square root of the radiation; that is, for constant image area $$\Delta I = I \sqrt{\frac{\Delta F}{F}}$$

when $\Delta I$=signal current
$I$=total current
$F$=total incident radiation
$\Delta F$=radiation from target However, the relationship between signal current ($\Delta I$), area of the target image ($Ai$) and area of the photo-cell element ($Ae$) is expressed, when the radiation flux-density of the image is constant, by $$\Delta I = \frac{I A i}{A e}$$

From these two formulae, it appears that maximum signal current from a given quantum of radiation in the target image is realized when that image is distributed evenly over the photo-sensitive area.

For purposes of this invention such even distribution cannot be fully employed because for control purposes sharp definition is required in the "$h$" dimension (measured in direction normal to the reference line H—H or V—V). Therefore, a cylindrical lens is used to enlarge the target in its "$w$" dimension (parallel to the reference line V—V or H—H); that is, the target image is distorted to have a sharply defined "height" but approximating in length the "width" of the photoconductive area.

Accordingly the target image as seen by the conjugate cells R, L is distorted by vertical expansion and as seen by conjugate cells U, D, is distorted by horizontal expansion.

In other homing systems which locate the position of the target with respect to four quadrants of the field of view, four amplifier channels have been provided to afford up-down and right-left control of the missile. As hereinafter more specifically explained, the number of required amplifier channels is reduced by generating carrier frequencies modulated in accordance with up-down and right-left signals respectively, by passing the different carrier frequencies through a common alternating current amplifier, of one or more stages, having a response bandwidth sufficient to include the different carrier frequencies, and by thereafter separating the different carriers, as by filter circuits, for application to the respective servo-mechanisms.

The arrangement for generating the carrier currents may comprise a chopper disk 8 whose inner section, alternately opaque and transparent, interrupts the path of radiation to the other pair of cells.

Rotation of disk 8 may conveniently be effected by propeller 9 and gears 10, 11 attached respectively to the propeller and the disk.

In the interest of compact design and reliable electrical operation, the diameter of disk 8 should be as small as possible consistent with circumference sufficiently large to accommodate an adequate number of the higher-frequency chopper segments. If the ratio of chopper segments in the outer and inner disk sections is too low, the difference between the carrier frequencies is too slight for separation of the different frequencies without recourse to elaborate filters.

To obtain maximum carrier current, each pair of cells must alternately be completely exposed to and completely shut off from the radiation. Consequently, the dimensions of the cells chosen determine the optimum minimum arc of the chopper segments. When the image-receiving surface of a pair of cells is round or square, the relation of the maximum dimension to the minimum dimension of each cell is about two to one.

The reference line V—V of cells R, L is in alignment with the vertical radius of the chopper wheel, and the reference line H—H of cells U, D is parallel to the horizontal diameter of the chopper wheel. Accordingly, the cells R, L continuously scan a target image along a vertical line of resistance and the other pair of cells continuously scans a similar image along a horizontal line of resistance, thus continuously and simultaneously to provide signals concurrently amplified and concurrently utilized for simultaneous right-left and up-down correction of the course of the missile.

The common terminal of cells R, L is connected to the cathodes of amplifier tubes 12, 13 in a current path including battery 14 or equivalent source of current. Similarly the common terminal of cells U, D is connected to these same cathodes in a current path including battery 15 or equivalent.

The control electrode of tube 12 is connected to the other terminals of cells R and D and the control electrode of tube 13 is connected to the other terminal of cells L and U. The filters F1, F1 in the output system of tubes 12 and 13 accept or pass the higher carrier frequency conveying the right-left signals and reject or discriminate against the lower carrier frequency. The signals passed by filter F1 control the position of rudder 2 through the servo-system 4 including tubes 16, 17 and the differential magnet system comprising coils 18, 19 disposed respectively in the anode circuits of tubes 16, 17 jointly to determine the position of their common armature 20 suitably connected to the rudder. The filters F2 pass the lower signal frequency, to the substantial exclusion of the higher signal frequency, for control of the position of vane 3 through the servo-system comprising tubes 21, 22, coils 23, 24 in the respective anode circuits thereof, and the common armature 25.

To ensure rapid correction of deviations from proper course without excessive overshooting or hunting, it is provided that the signal output shall increase at greater and greater rate for successive equal increases in magnitude of the angle of deviation from the homing course. As hereinafter more specifically appears, Figs. 5 to 8, this may be attained by varying the length or width, or both, of photo-sensitive areas of each cell as a function of the distance from the reference line H—H or V—V, or by use of an optical filter, such as a film, whose opacity varies as function of that distance.

In explanation preliminarily to discussion of Figs. 5 to 7, reference is made to Fig. 4 showing a conventional photo-cell element comprising a photo-conductive film of uniform thickness and constant resistance coefficient dimension $K_1$. The resistance R of such cell or photo-electric element may be expressed as (1) $$R = K_1 \frac{h}{w}$$

where $h$ is the height and $w$ is the width of the element.

When the carrier voltage appearing between the cell electrodes is a constant $K_2$, the carrier current $I$ may be expressed as $$(2) \qquad I = \frac{K_2}{R}$$

The change in carrier current $\Delta I$ resulting from photo-conductive reaction to a target image is $$(3) \qquad \Delta I = I \frac{\Delta R}{R}$$

Substituting Equation 1 in Equation 3

$$(4) \qquad I = I \frac{\Delta R w}{k_1 h}$$

Substituting Equation 2 in Equation 4

$$(5) \qquad I = \frac{\Delta R}{R} \cdot \frac{K_2}{K_1} \cdot \frac{w}{h}$$

It is thus seen that all other factors remaining constant, the change in carrier current is directly proportional to the width of and inversely proportional to the height of the photosensitive area.

In the modified form of photo-cell shown in Fig. 5, a plurality of electrodes are connected to each terminal of the cell, the spacing between adjacent electrodes of opposite polarity decreasing with increasing distance from the reference line H—H or V—V. The "width" of the photosensitive film is, in this modification, constant for all sections of the cell but the "height" of the film progressively decreases for the more and more remote sections.

When a given target image moves for example from section $R_n$ to the next section $R_{n+1}$, the factor of change "$a$" produced in these elements may be expressed as $$(6) \qquad a = \frac{\Delta I_{n+1}}{\Delta I_n} = \frac{R_n h_n W_n}{R_{n+1} h_{n+1}} = \frac{R_n h_n}{R_{n+1} h_{n+1}}$$

Expressed in terms of elemental areas, Equation 6, by substitution of Equation 1, becomes $$(7) \qquad a = \left(\frac{h_n}{h_{n+1}}\right)^2$$

In the modification shown in Fig. 6, the "height" of the successive cell elements is constant but their width progressively increases with distance from the reference line H—H or V—V. By steps corresponding to Equations 1 to 6, it can be shown the factor of change "$a$" afforded by this form of cell may be expressed as $$a = \frac{(w_{n+1})^2}{(w_n)}$$

In the modification shown in Fig. 7, both the width and height of the successive cell elements vary as a function of the distance from the reference line H—H or V—V. In such case the factor of change "$a$" may be expressed as $$a = \left(\frac{h_n W_{n+1}}{h_{n+1} W_n}\right)^2$$

As an alternative to, or in modification of the response characteristics of, any of the forms shown in Figs. 5 to 7, there may be positioned in front of each pair of photo-cells a filter, such as film 26, whose opacity to the target image progressively decreases with increasing deviation from the reference line. In effect, an increasingly intense radiation-image is applied to the cell—and a correspondingly increased signal is supplied for course correction—as the distance of the target image from the reference line H—H or V—V increases.

It shall be understood my invention is not limited to specific arrangements herein disclosed but is coextensive in scope with the appended claims.

The invention described herein may be made and used by or for the Government of the United States for governmental purposes without the payment to me of any royalties thereon or therefor.

What I claim is:

1. A system for steering an object toward a target comprising photo-cells disposed to generate signals for effecting up-down and right-left steering control, and an optical system for impressing radiation from the target on said photo-cells having a wider angle of view in the horizontal plane than in the vertical plane.

2. A system for steering an object in horizontal and vertical directions toward a target comprising pairs of photo-cells disposed to generate steering signals in accordance with deviations of radiation images of the target from horizontal and vertical reference lines, and an optical system for impressing said images on said cells comprising cylindrical lenses disposed with their axes respectively parallel to said reference lines.

3. A system for steering an object toward a target comprising a pair of photo-cells for generating a signal for effecting right-left steering control, a cylindrical lens for impressing an image of the target on said first pair of cells, and a second cylindrical lens having a substantially greater field of view than the first-named lens for impressing an image of the target on said second pair of cells.

4. A system for generating signals in accordance with deviations of a radiation image from angularly displaced reference lines comprising two pairs of photocells, the cells of each pair being disposed on opposite sides of one of said reference lines, and an optical system comprising cylindrical lenses each for impressing a radiation image on one of said pairs of cells.

5. A system for generating signals in accordance with deviations of a radiation image from a reference line comprising a pair of photo-cells disposed respectively on opposite sides of said line, and a cylindrical lens having its axes parallel to said line for impressing said image on said cells.

6. A system for steering an object toward a target comprising photo-cells for generation of signals effecting up-down and right-left steering control, a common amplifier upon which said signals are impressed, means in advance of said amplifier channel for varying the up-down and right-left signals at different frequencies, and filter means on the output side of said amplifier for segregating said different frequencies for transmission in different paths.

7. A system for steering an object toward a target comprising pairs of photo-cells for generation of signals effecting up-down and right-left steering control, a common amplifier upon which said signals are impressed, means for interrupting at different rates the paths of radiation from said target to said pairs of cells to generate different carrier frequencies for said signals, and filter means on the output side of said amplifier for segregating said different frequencies.

8. A system for steering an object toward a target comprising pairs of photo-cells for generation of signals effecting up-down and right-left steering control, a common amplifier upon which said signals are impressed, rotating shutter means for interrupting at different rates the paths of radiation from said target to said pairs of cells to generate different carrier frequencies for said signals, and filter means on the output side of said amplifier for segregating said different frequencies.

9. In a control system, a rotating shutter having concentric rows of angularly spaced segments, a pair of photo-cells disposed on opposite sides of a vertical reference line normal to the axis of rotation of said shutter and receiving radiation in a path interrupted by one of said rows of segments, and a second pair of photo-cells disposed on opposite sides of a horizontal reference line and receiving radiation in a path interrupted by another row of said segments.

10. In a control system, a pair of photo-cells disposed on opposite sides of a reference line for generating signals varying in accordance with deviation of a radiation image from said reference line, each of said cells having electrodes parallel to and at different distances from said reference line and the ratio of height to width of successive cell areas defined by said electrodes varying as a function of their distance from said reference line.

11. In a control system, a pair of photo-cells disposed on opposite sides of a reference line for generation of signals varying in accordance with deviation of a radiation image from said reference line, each of said cells having electrodes parallel to said reference line with the spacing between adjacent electrodes decreasing with increase of distance from said reference line.

12. In a control system, a pair of photo-cells disposed on opposite sides of a reference line for generation of signals varying in accordance with deviation of a radiation image from said reference line, each of said cells having electrodes parallel to said reference line and bounding areas of photo-conductive material whose width varies as a function of distance from the reference line.

13. In a control system, a pair of photo-cells disposed on opposite sides of a reference line for generation of signals varying in accordance with deviation of a radiation image from said reference line, each of said cells having electrodes parallel to said reference line with the spacing between successive pairs of electrodes decreasing with increase of distance from said reference line and with the width of photo-conductive material between successive pairs of adjacent electrodes varying as a function of distance from said reference line.

14. In a control system, photo-cells disposed on opposite sides of a reference line for generation of signals varying in accordance with deviation of a radiation image from said reference line, and an optical filter in front of said cells of opacity decreasing with increase of distance from said reference line.

15. A system for correcting the course of an object moving toward a target in accordance with deviation of images of the target from vertical and horizontal reference lines comprising two pairs of photo-cells, the cells of each pair being disposed on opposite sides of one of said reference lines, and means for increasing the output of each pair of cells disproportionately to increase of deviation of the image from the associated reference line.

16. A system for correcting the course of an object moving toward a target in accordance with deviation of images of the target from horizontal and vertical reference lines comprising two pairs of photo-cells, the cells of each pair being disposed on opposite sides of one of said reference lines, a pair of cylindrical lenses having their axes respectively parallel to said reference lines to impress radiation images of the target on said pairs of cells, movable shutter means for interrupting the paths of radiation to said cells to vary their outputs at different carrier frequencies, means for increasing the output of each pair of cells disproportionately to increase of deviation of the target image from the associated reference line, a common amplifier upon which the outputs of said cells are impressed, and filter means on the output side of said amplifier for segregating the different carrier frequencies for transmission in different paths.

THORNTON W. CHEW.

REFERENCES CITED

The following references are of record in the file of this patent:

UNITED STATES PATENTS

| Number | Name | Date |
|---|---|---|
| 1,388,932 | Centervall | Aug. 30, 1921 |
| 1,747,664 | Droitcour | Feb. 18, 1930 |
| 1,016,240 | Alexieff | Jan. 30, 1912 |
| 2,403,387 | McLennan | July 2, 1946 |
| 2,164,916 | Hammond, Jr. | July 4, 1939 |

FOREIGN PATENTS

| Number | Country | Date |
|---|---|---|
| 836,555 | France | Oct. 17, 1938 |
| 352,035 | Great Britain | June 22, 1931 |
| 367,283 | Great Britain | Feb. 18, 1932 |